US010976413B2

(12) United States Patent
Han et al.

(10) Patent No.: US 10,976,413 B2
(45) Date of Patent: Apr. 13, 2021

(54) LIDAR SYSTEM WITH SYNCHRONIZED MEMS MIRRORS

(71) Applicant: Baidu USA LLC, Sunnyvale, CA (US)

(72) Inventors: Yang Han, San Jose, CA (US); Yaoming Shen, Milpitas, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 510 days.

(21) Appl. No.: 15/432,804

(22) Filed: Feb. 14, 2017

(65) Prior Publication Data

US 2018/0231640 A1 Aug. 16, 2018

(51) Int. Cl.
G01S 7/481 (2006.01)
G01S 17/931 (2020.01)
G01S 17/10 (2020.01)
G02B 26/08 (2006.01)
G02B 26/10 (2006.01)

(52) U.S. Cl.
CPC ........... G01S 7/4811 (2013.01); G01S 7/4817 (2013.01); G01S 17/10 (2013.01); G01S 17/931 (2020.01); G02B 26/0833 (2013.01); G02B 26/101 (2013.01)

(58) Field of Classification Search
None
See application file for complete search history.

(56) References Cited

U.S. PATENT DOCUMENTS 9,784,835 B1* 10/2017 Droz .................... G08G 1/166
9,983,590 B2* 5/2018 Templeton ............ G01S 17/42
2003/0138020 A1* 7/2003 Chen ....................... G01P 3/366
　　　　　　　　　　　　　　　　　　　　　　372/75
2015/0378012 A1* 12/2015 Sayyah ................... G01S 17/34
　　　　　　　　　　　　　　　　　　　　　　356/4.01
2016/0274589 A1* 9/2016 Templeton ............. G01S 17/86
2016/0282453 A1* 9/2016 Pennecot ............. G01S 7/4817
2017/0038581 A1   2/2017 Gilboa et al.
2018/0081037 A1* 3/2018 Medina ................ G01S 7/4815
(Continued)

FOREIGN PATENT DOCUMENTS

EP 2105706 A2 9/2009
EP 2829894 A1 1/2015
(Continued)

*Primary Examiner* — Yuqing Xiao
*Assistant Examiner* — Amir J Askarian
(74) *Attorney, Agent, or Firm* — Womble Bond Dickinson (US) LLP

(57) ABSTRACT

In one embodiment, a light detection and range (LIDAR) device includes a light source to emit a light beam to scan a range of orientations associated with a target scanning zone. The LIDAR device further includes a first microelectromechanical system (MEMS) mirror configured to receive and redirect the light beam towards to the target scanning zone. The first MEMs mirror is configured to tilt vertically and horizontally to redirect the light beam in a plurality of angles. The LIDAR device further includes a light detector to receive the light beam reflected from one or more objects located within the target scanning zone. The first MEMS mirror tilts multiple directions with respect to the light source to allow the light source to emit the light beam and the light detector to receive the reflected light beam to obtain multiple angular resolutions of the one or more objects.

12 Claims, 11 Drawing Sheets

(56) References Cited

U.S. PATENT DOCUMENTS

| | | | |
|---|---|---|---|
| 2018/0100928 A1* | 4/2018 | Keilaf | G01S 7/4868 |
| 2018/0100929 A1* | 4/2018 | O'Keeffe | G01S 17/931 |
| 2018/0188370 A1* | 7/2018 | Lin | G01S 17/08 |

FOREIGN PATENT DOCUMENTS

| | | |
|---|---|---|
| JP | 64-026816 A | 1/1989 |
| JP | 2010-217782 A | 9/2010 |
| JP | 2013-210315 A | 10/2013 |
| JP | 2014-219250 A | 11/2014 |
| JP | 2016-109517 A | 6/2016 |
| JP | 2016-224058 A | 12/2016 |
| WO | 2017/018152 A1 | 2/2017 |

* cited by examiner

LIDAR SYSTEM WITH SYNCHRONIZED MEMS MIRRORS

TECHNICAL FIELD

Embodiments of the present invention relate generally to operating autonomous vehicles. More particularly, embodiments of the invention relate to a light detection and range (LIDAR) device for operating an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

LIDAR techniques have been widely utilized in military, geography, oceanography, and in the latest decade, autonomous driving vehicles. Apart from others, LIDAR's applications in autonomous driving vehicles have been hindered by the high cost. A LIDAR device can estimate a distance to an object while scanning through a scene to assemble a point cloud representing a reflective surface of the object. Individual points in the point cloud can be determined by transmitting a laser pulse and detecting a returning pulse, if any, reflected from the object, and determining the distance to the object according to the time delay between the transmitted pulse and the reception of the reflected pulse. A laser or lasers, can be rapidly and repeatedly scanned across a scene to provide continuous real-time information on distances to reflective objects in the scene.

FIG. 1 shows a typical LIDAR device. Referring to FIG. 1, LIDAR device 180 includes beam steering optics 184, where a laser beam 186 is directed to the beam steering optics 184. Beam steering optics 184 is a rotating angled mirror that directs laser beam 186 (e.g., rotating horizontally) to sweep across a scanning zone. Rotating angled mirror 184 rotates about an axis substantially parallel, and roughly in line with, the initial downward path of the laser beam 186. The rotating angled mirror 184 rotates in the direction indicated by the reference arrow 188. Typically, mirror 184 is attached to a frame of range finder 182 with a fixed angle. Mirror 184 rotates together with the entire LIDAR device 180 according to rotating direction 188.

The most popular design of LIDAR includes 16 to 64 of 907 nanometer (nm) semiconductor lasers, corresponding detectors, and electronics stacked into a single assembly to provide angular resolutions in a stacking direction. The whole assembly is then spun around an axle mechanically to achieve scanning in two dimensions (2D). In order to obtain multiple angular resolutions, multiple of LIDAR device 180 may be stacked together vertically, each corresponding one of the targeted angular resolutions. The number of lasers and detectors required significantly limits the achievement of previous effort for cost reduction.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
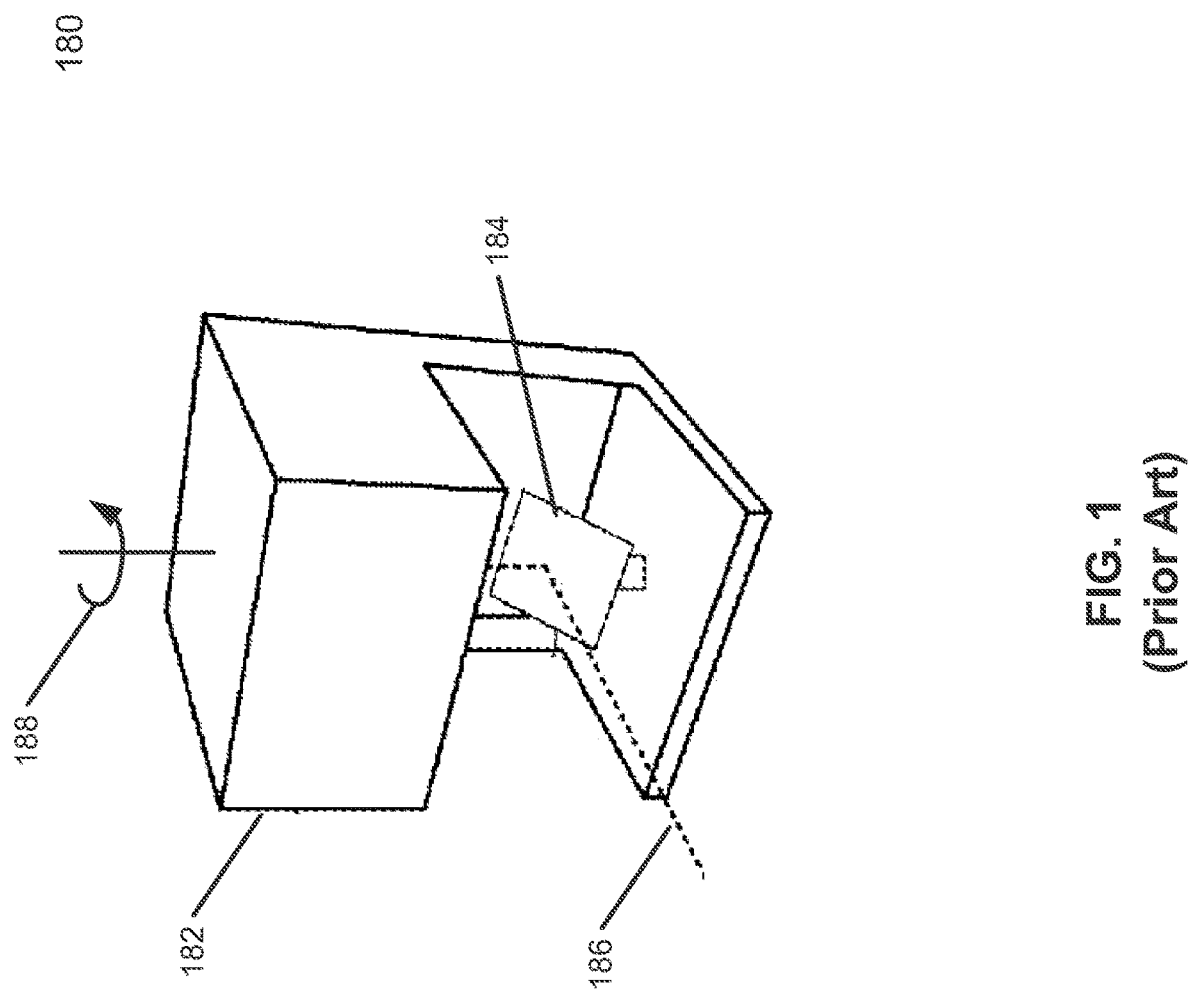
FIG. 1 shows a typical LIDAR device.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a LIDAR device includes a light source (e.g., laser) to emit a light beam (e.g., a laser beam) and a mirror to reflect the light beam towards a target zone. The light source and the mirror are rotated horizontally to scan the target zone. In addition, the mirror is configured to tilt or swing in multiple directions, such as upwardly and downwardly, to a certain degree to emit the light beam in multiple angles. The LIDAR device can receive the light beam reflected from an object within the target zone in multiple angles, which may be utilized to derive or develop multiple angular resolutions of the scanned object. As a result, a single LIDAR device (with a single light source and single light detector) can scan and capture multiple angular resolutions of an object. The number of LIDAR devices (or number of light sources and light detectors) required to scan an object can be reduced and the cost for operating an autonomous driving vehicle (ADV) can also be reduced.

In one embodiment, a LIDAR device includes a light source to emit a light beam, a first microelectromechanical system (MEMS) mirror, and a light detector. The light source is to emit a light beam (e.g., in a form of light pulses) to scan a scope or a range of orientations of a target scanning zone. The first MEMS mirror is to receive and redirect (or reflect) the light beam towards the target scanning zone. The first MEMS mirror is configured to tilt or swing in multiple directions or angles to redirect the light beam in multiple angles (e.g., vertical and/or horizontal angles). The light detector is to receive the light beam reflected from one or more objects located within the target scanning zone. The light source, the first MEMS mirror, and the light detector are configured to rotate horizontally to scan a field of view, while the first MEMS mirror is to title or swing in multiple directions or angles to allow the light source to emit the light beam and the light detector to receive the reflected light beam in multiple angles to obtain multiple angular resolutions of the one or more objects.

According to another embodiment, a LIDAR device further includes a second MEMS mirror positioned to receive the light beam reflected from the one or more objects and to redirect the received light beam to the light detector in multiple angles. The second MEMS mirror is configured to tilt or swing in multiple directions or angles to receive the reflected light beam from multiple angles representing multiple angular resolutions of the one or more objects. In one embodiment, the first and second MEMS mirrors are configured to swing according to a predetermined synchronization scheme, such that the light source can emit the light beam and the light detector can receive the reflected light beam in multiple angles respectively.

According to another embodiment, the first MEMS mirror is a double-sided mirror having a first reflective surface and a second reflective surface. The first reflective surface is to redirect a light beam from the light source towards to the target scanning zone. The second reflective surface is to receive the light beam reflected from one or more objects within the target scanning zone. In one embodiment, a static mirror is positioned to receive the reflected light beam from the objects and to redirect the reflected light beam to the second reflective surface of the first MEMS mirror. The second reflective surface of the first MEMS mirror can then reflect and redirect the light beam to the light detector. The static mirror may be a mirror of any kinds; it does not have to be a MEMS mirror. The static mirror may or may not rotate with respect to the light source dependent upon the specific design and implementation.

Figure 2:
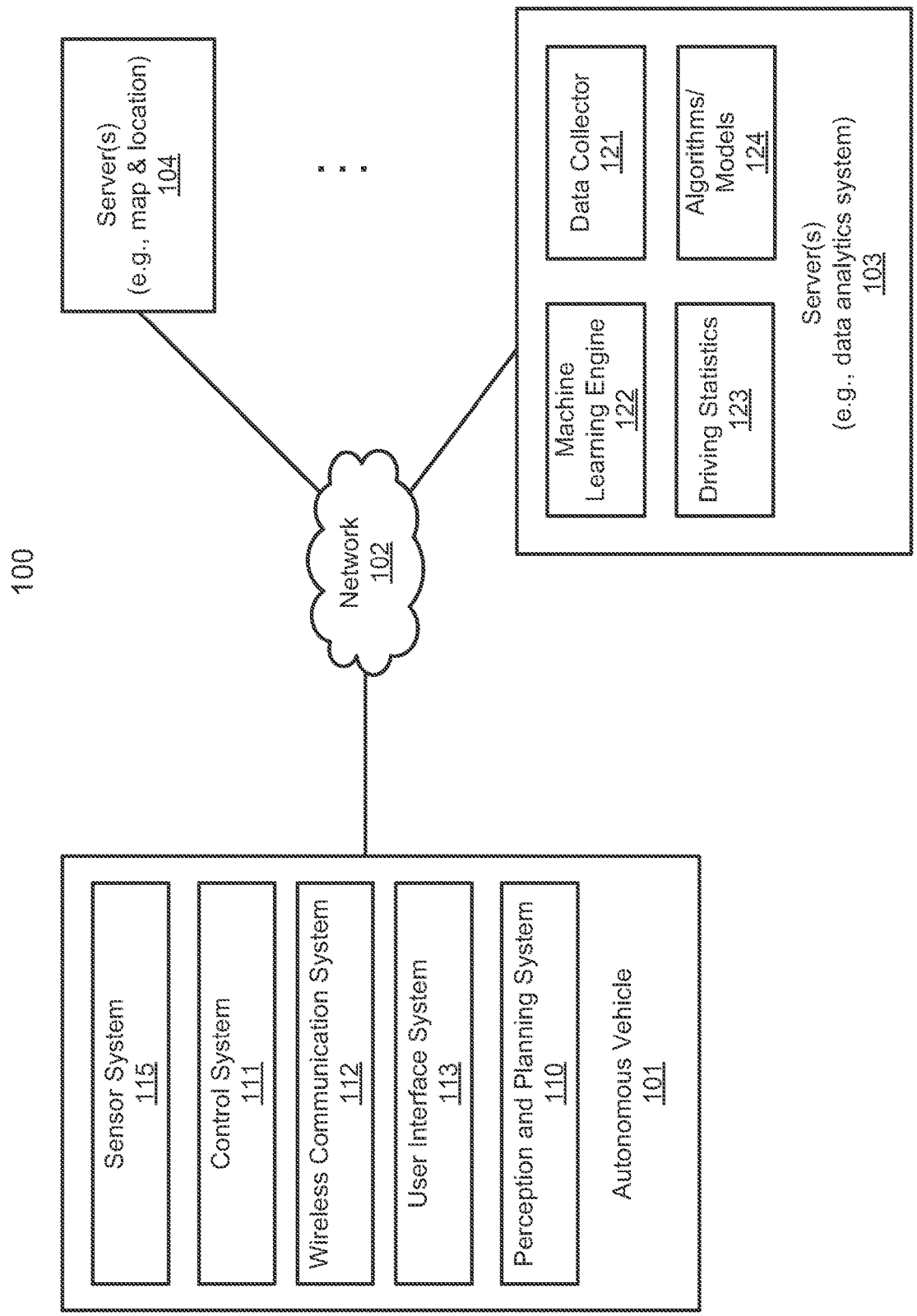
FIG. 2 is a block diagram illustrating a networked system according to one embodiment of the invention.

FIG. 2 is a block diagram illustrating an autonomous vehicle network configuration according to one embodiment of the invention. Referring to FIG. 2, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 3:
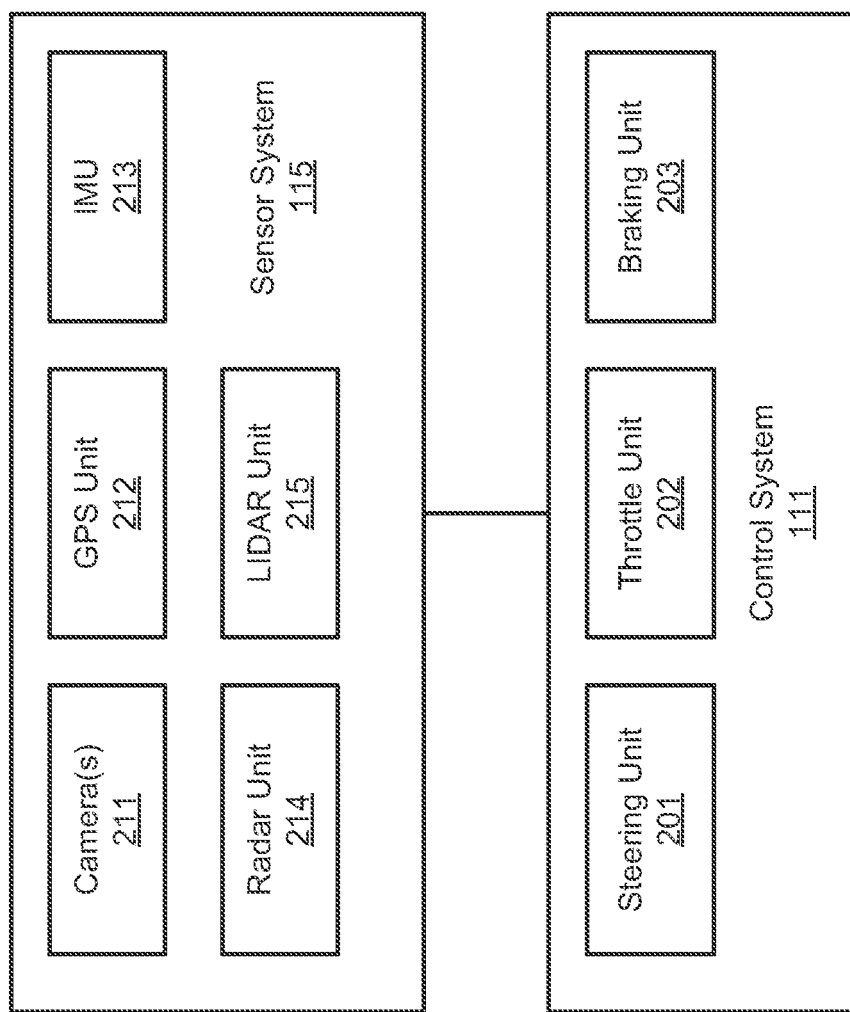
FIG. 3 is a block diagram illustrating an example of an autonomous vehicle according to one embodiment of the invention.

Referring now to FIG. 3, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 3 may be implemented in hardware, software, or a combination thereof.

Referring back to FIG. 2, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 performs or trains a set of rules, algorithms, and/or predictive models 124 for a variety of purposes. Algorithms/models 124 may be specifically designed or configured for a particular vehicle or a particular type of vehicles. Algorithms/models 124 may then be uploaded onto the associated ADVs for driving the ADVs at real-time. Algorithms/models 124 may be utilized to plan, route, and control the ADVs under a variety of driving scenarios or conditions.

Figure 4:
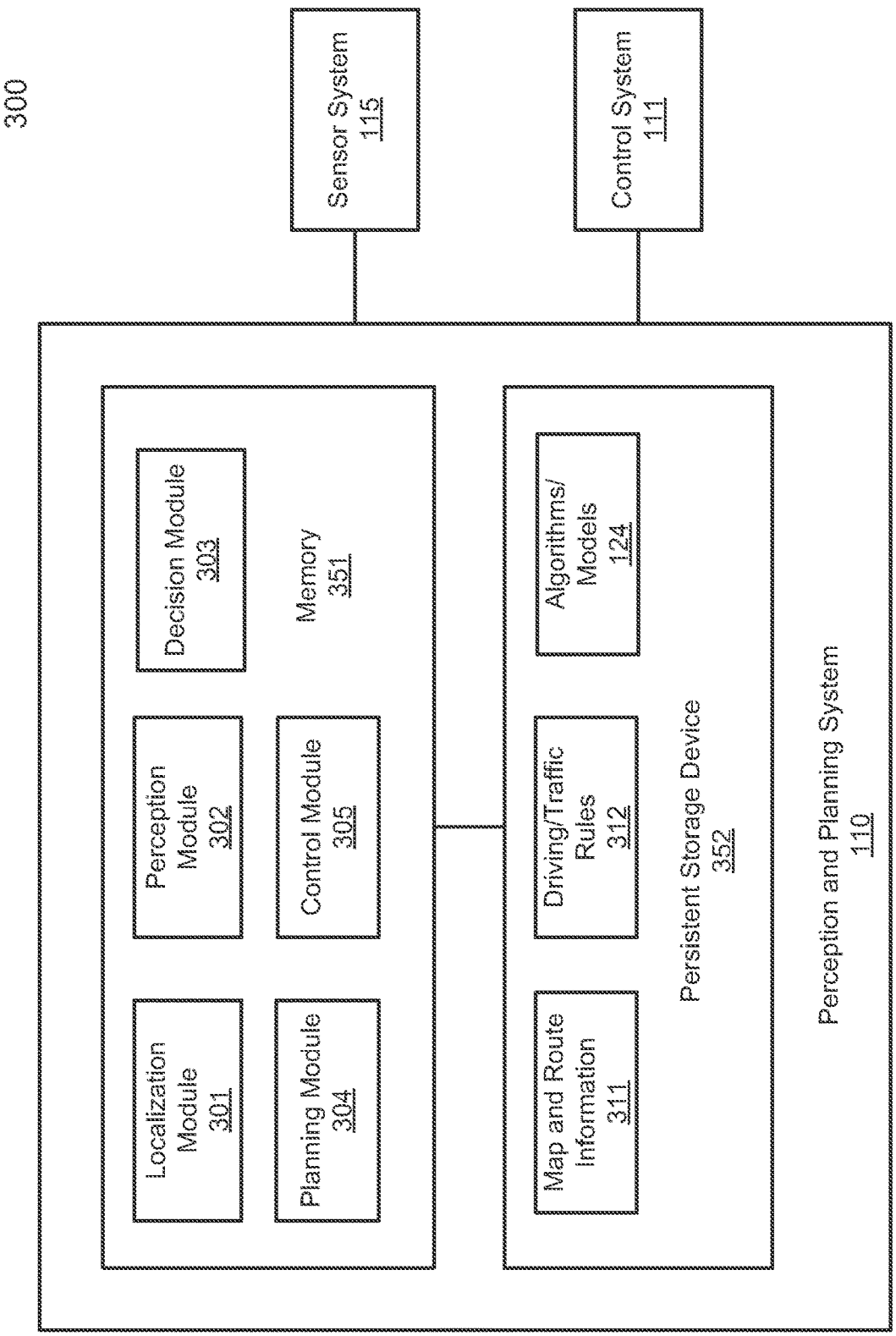
FIG. 4 is a block diagram illustrating an example of a perception and planning system used with an autonomous vehicle according to one embodiment of the invention.

FIG. 4 is a block diagram illustrating an example of a perception and planning system used with an autonomous vehicle according to one embodiment of the invention. System 300 may be implemented as a part of autonomous vehicle 101 of FIG. 2 including, but is not limited to, perception and planning system 110, control system 111, and sensor system 115. Referring to FIG. 4, perception and planning system 110 includes, but is not limited to, localization module 301, perception module 302, decision module 303, planning module 304, and control module 305.

Some or all of modules 301-305 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 3. Some of modules 301-305 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 5:
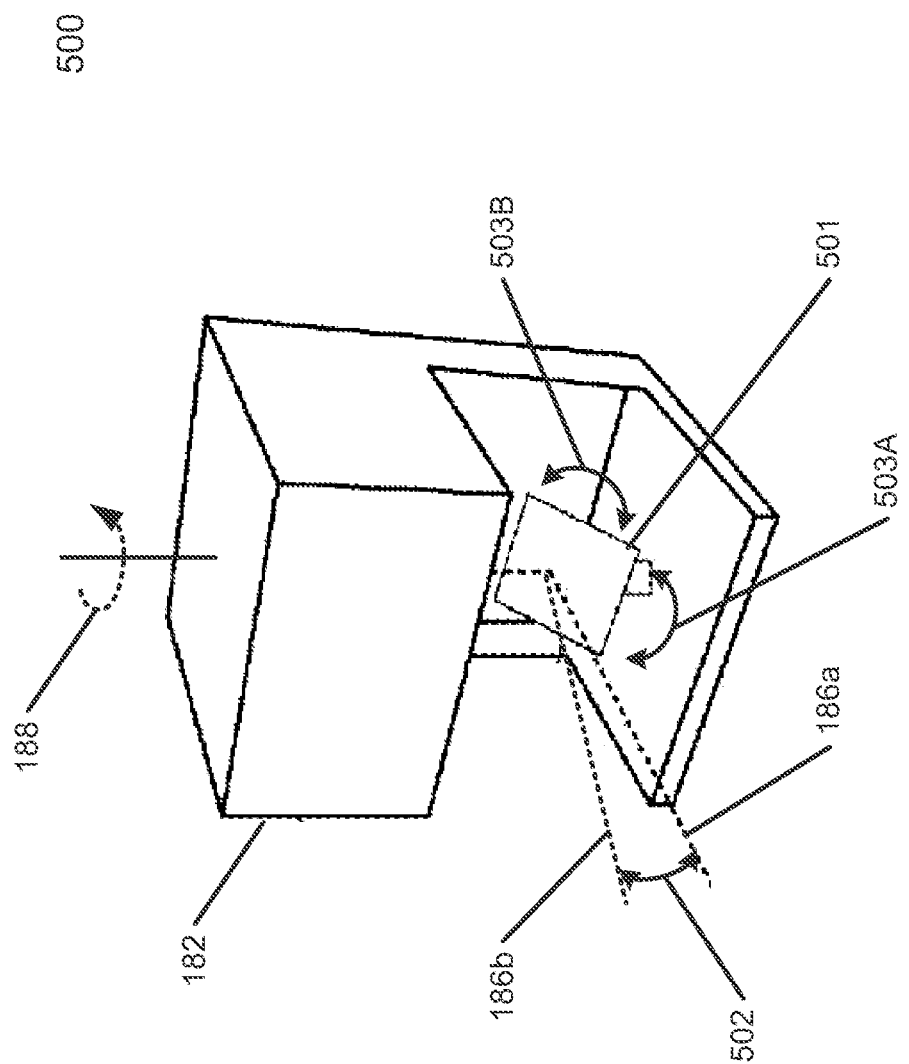
FIG. 5 is a diagram illustrating an example of a LIDAR device according to one embodiment of the invention.

FIG. 5 is a diagram illustrating an example of a LIDAR device according to one embodiment of the invention. LIDAR device 500 may be implemented as part of LIDAR unit 215 of FIG. 2B. Referring to FIG. 5, similar to conventional LIDAR device 180 of FIG. 1, LIDAR device 500 includes beam steering optics 501, where a laser beam 186 is directed to the beam steering optics 501. Beam steering optics 501 is a rotating angled mirror that directs laser beam 186 to sweep across a scanning zone. Rotating angled mirror 501 rotates about an axis substantially parallel, and roughly in line with, the initial downward path of the laser beam 186. The rotating angled mirror 501 rotates in the direction indicated by the reference arrow 188. Typically, mirror 184 is attached to a frame of range finder 182 with a fixed angle. Mirror 501 may rotate together with the entire LIDAR device 500 according to rotating direction 188.

In addition, according to one embodiment, optics 501 is a MEMS mirror that can be configured to tilt or swing in multiple directions (e.g., vertically, horizontally, diagonally, or a combination thereof), as indicated by directions 503A and 503B. As a result, the light beam from the light source can be reflected or redirected to multiple angles as light beams 186a and 186b. In one embodiment, when LIDAR device 500 rotates horizontally, MEMS mirror 501 rotate horizontally (along direction 188) together with the main body 182 of LIDAR device 500, while MEMS mirror 501 can tilt vertically (e.g., upwardly and downwardly along direction 503B) with respect to the main body 182.

According to another embodiment, MEMS mirror is configured to rotate in multiple directions (e.g., vertically, horizontally, diagonally, or a combination thereof), while main body 182 remains in a steady position. Such a MEMS mirror capable of rotating in multiple directions is referred to as a two-dimensional (2D) mirror. According to a further embodiment, two one-dimensional (1D) MEMS mirrors can also be utilized. In this embodiment, one MEMS mirror tilts in a vertical direction and the other MEMS mirror tilts in a horizontal direction.

Thus, due to swinging in multiple angles, such as upwardly and downwardly, of MEMS mirror 501, a light beam can be emitted in a range of angles 502 (e.g., a range of angles) and the reflected light beams from multiple angles can be utilized to derive multiple angular resolutions of an object. As a result, a single LIDAR device (with a single light source and single light detector) can scan and capture multiple angular resolutions of an object. The number of LIDAR devices (or number of light sources and light detectors) required to scan an object can be reduced and the cost for operating an autonomous driving vehicle (ADV) can also be reduced.

In one embodiment, LIDAR device 500 includes a light source (not shown) to emit a light beam, first microelectromechanical system (MEMS) mirror 501, and a light detector (not shown). The light source is to emit light beam 186 (e.g., in a form of light pulses) to scan a scope or a range of orientation associated with a target scanning zone according to direction 188. The MEMS mirror 501 is to receive and redirect (or reflect) the light beam 186 towards the target scanning zone. The MEMS mirror 501 is configured to tilt or swing in multiple directions (e.g., direction 503A, direction 503B, or a combination thereof) to redirect the light beam in multiple angles (e.g., vertical and/or horizontal angles) as indicated as part of light beams 186a-186b. The light detector is to receive the light beams 186a-186b reflected from one or more objects located within the target scanning zone (not shown). In one embodiment, the light source, the MEMS mirror 501, and the light detector are configured to rotate horizontally to scan a field of a view, while the MEMS mirror 501 is to title or swing in multiple directions (e.g., vertically, horizontally, diagonally, or a combination thereof) to allow the light source to emit the light beam and the light detector to receive the reflected light beam in multiple angles to obtain multiple angular resolutions of the one or more objects. According to another embodiment, MEMS mirror 501 is to tilt or swing in in multiple directions (e.g., vertically, horizontally, diagonally, or a combination thereof), while main body 182 of LIDAR device 500 remains steady. Since a single LIDAR device can handle multiple angular resolutions, the number of LIDAR devices that are required to scan an object can be reduced and the associated cost can be reduced.

Figure 6:
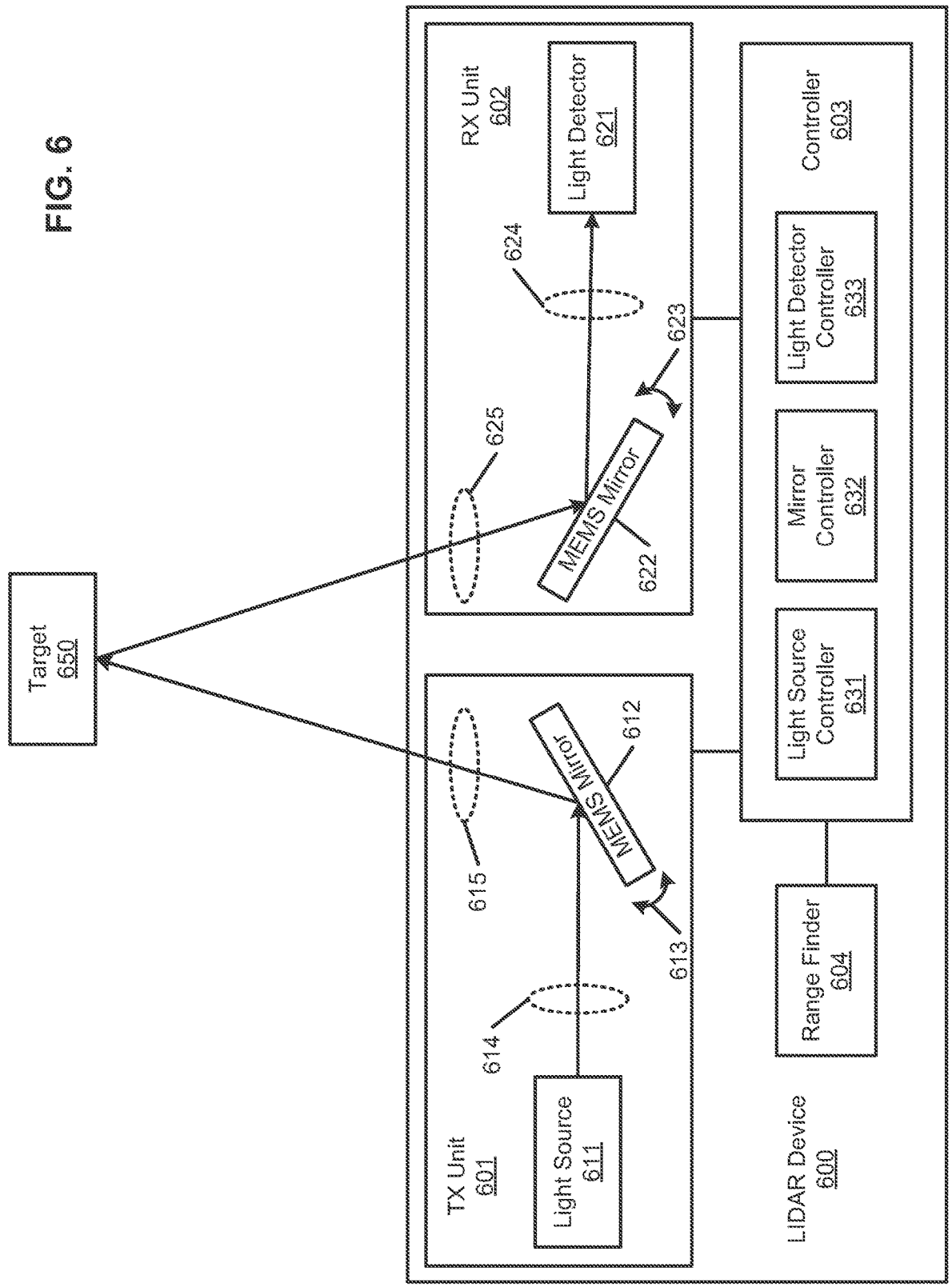
FIG. 6 is a block diagram illustrating an example of a configuration of a LIDAR device according to one embodiment of the invention.

FIG. 6 is a block diagram illustrating an example of a configuration of a LIDAR device according to one embodiment of the invention. LIDAR device 600 may represent LIDAR device 500 of FIG. 5. Referring to FIG. 6, LIDAR device 600 includes a transmitter (TX) unit 601 (also referred to as a scanning unit) and a receiver (RX) unit 602. TX unit 601 is configured to emit a light beam towards target 650 and RX unit 602 is configured to receive the light beam reflected by target 650. Although TX unit 601 and RX unit 602 are shown as separate units, they can be implemented as a single integrated unit.

In one embodiment, TX unit 601 includes light source 611 and first MEMS mirror 612. RX unit 602 includes second MEMS mirror 622 and light detector 621. Light source 611 can include a laser diode, a light emitting diode (LED), a vertical cavity surface emitting laser (VCSEL), an organic light emitting diode (OLED), a polymer light emitting diode (PLED), a light emitting polymer (LEP), a liquid crystal display (LCD), and/or any other device configured to selectively emit a light beam. Light source 611 can be configured to emit a light beam in a wavelength range that can be detected by light detector 621. The wavelength range could, for example, be in the ultraviolet, visible, and/or infrared portions of the electromagnetic spectrum. In one embodiment, the wavelength range includes wavelengths that are approximately 905 nm. Light source 611 can be configured to emit a light beam in the form of pulses. Light detector 612 may include a photodiode, an avalanche photodiode, a phototransistor, a camera, an active pixel sensor (APS), a charge coupled device (CCD), a cryogenic detector, and/or any other sensor of light configured to receive light having wavelengths in the wavelength range of light source 611.

Light source 611 emits a light beam to first MEMS mirror 612, which reflects and redirects the light beam towards target 650. The light beam reflected from target 650 is received by second MEMS mirror 622, which reflects and redirects the reflected light beam to light detector 621. The operations of TX unit 601 and RX unit 602 are controlled by controller 603, which may be implemented in hardware, software, or a combination thereof. In one embodiment, controller 603 includes light source controller 631, mirror controller 632, and light detector controller 633. Light source controller 631 controls light source 611 to generate and emit a light beam. Light detector controller 633 controls light detector 621 to receive and detect the reflected light beam.

In one embodiment, mirror controller 632 is configured to control first MEMS mirror 612 and second MEMS mirror 622 to swing in multiple directions as indicated as directions 613 and 623, respectively. Each of first MEMS mirror 612 and second MEMS mirror 613 can swing or tilt in various directions, such as, vertically (e.g., upwardly and downwardly), horizontally (e.g., left and right, or sideway), diagonally, or a combination thereof. In this configuration, light source 611 and light detector 621 are mounted on a fixed position. When light source 611 emits a light beam towards MEMS mirror 612, the light beam is reflected and redirected to target 650 in multiple angles due to the rotations of MEMS mirror 612 in multiple directions with respect to light source 611. Similarly, the light beams reflected from target 650 can be captured by MEMS mirror by rotating MEMS mirror with respect to light detector 621 and redirected to light detector 621. As a result, single light source 611 and light detector 621 can obtain multiple angular resolutions of target 650, which may be utilized by range finder 604 to determine a range of distance and orientation of target 650. Range finder 604 can compare a time when the light pulses included in the light beam emitted by light source 611 with a time when the corresponding reflected light beam is received by light detector 621 to determine the distance between the objects and the LIDAR device.

In one embodiment, in order to capture multiple reflected light beams emitted from light source 611 and redirected by MEMS mirror 612 by rotating, MEMS mirror 622 may rotate according to certain synchronization scheme. Specifically, MEMS mirrors 612 and 622 may be controlled by mirror controller 632 to rotate synchronously, such that light detector 621 can receive multiple light beams spread by MEMS mirror 612 representing multiple angular resolutions of target 650. As a result, a number of LIDAR devices can be reduced as a whole to capture enough angular resolutions of an object.

According to another embodiment, TX unit 601 further includes first lens 614 to convert a light beam emitted from light source 611 from an unfocused light beam into a focused light beam. The focal point of lens 614 may be configured to reach a reflective surface of MEMS mirror 612. Since the size of reflective surface of MEMS mirror 612 tends to be relatively small, lens assembly 614 can provide a focused light beam with a higher strength. In general, light source 611 may emit an uncollimated and unfocused light beam that diverges more in one direction than another direction. Lens 614 may partially collimate the light beam before the partially collimated light beam reaches MEMS mirror 612.

Figure 7:
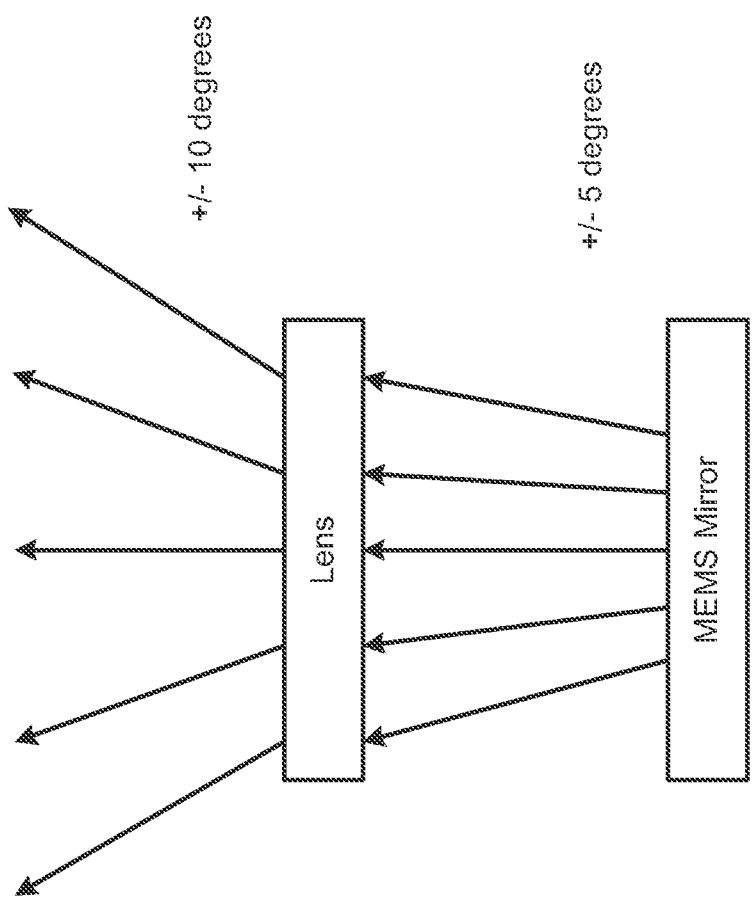
FIG. 7 shows a configuration of a LIDAR device according to another embodiment of the invention.

In one embodiment, TX unit 601 further optionally includes second lens assembly 615 to receive a light beam from MEMS mirror 612, collimate the light beam to generate a collimated light beam, and to direct the collimated light beam to target 650. The collimated light beam may reflect from target 650 and received by MEMS mirror 622. In addition to collimating the light beam, lens assembly 615 may further spread the light beam to scan in a wider angle than the angle received from MEMS mirror 612, as shown in FIG. 7. A wider angled light beam can generate wider angular range. Similarly, RX unit 602 may further optionally include lens 624 and lens 625 corresponding to lens 614 and lens 615 in a reversed direction, respectively. For example, lens 625 may convert wide angled light beams into narrower angled light beams. Lens 624 may convert more focused light beams into more spreaded light beams so that detector 621 can easily receive them.

Note that MEMS mirrors 612 and 622 can swing, rotate, or tilt vertically, horizontally, diagonally, or in any other directions, as long as MEMS mirror 612 can spread a light beam emitted from light source 611 in multiple angles and MEMS mirror 622 can receive and capture the corresponding reflected light beam in multiple angles. In operating an autonomous driving vehicle, multiple of LIDAR devices 600 may be employed to sufficiently capture the external environment of the ADV. However, since a single LIDAR device can make measurements along multiple angular orientations, the total number of LIDAR devices can be reduced. A conventional LIDAR device typically can only capture a single angular resolution.

Figure 8:
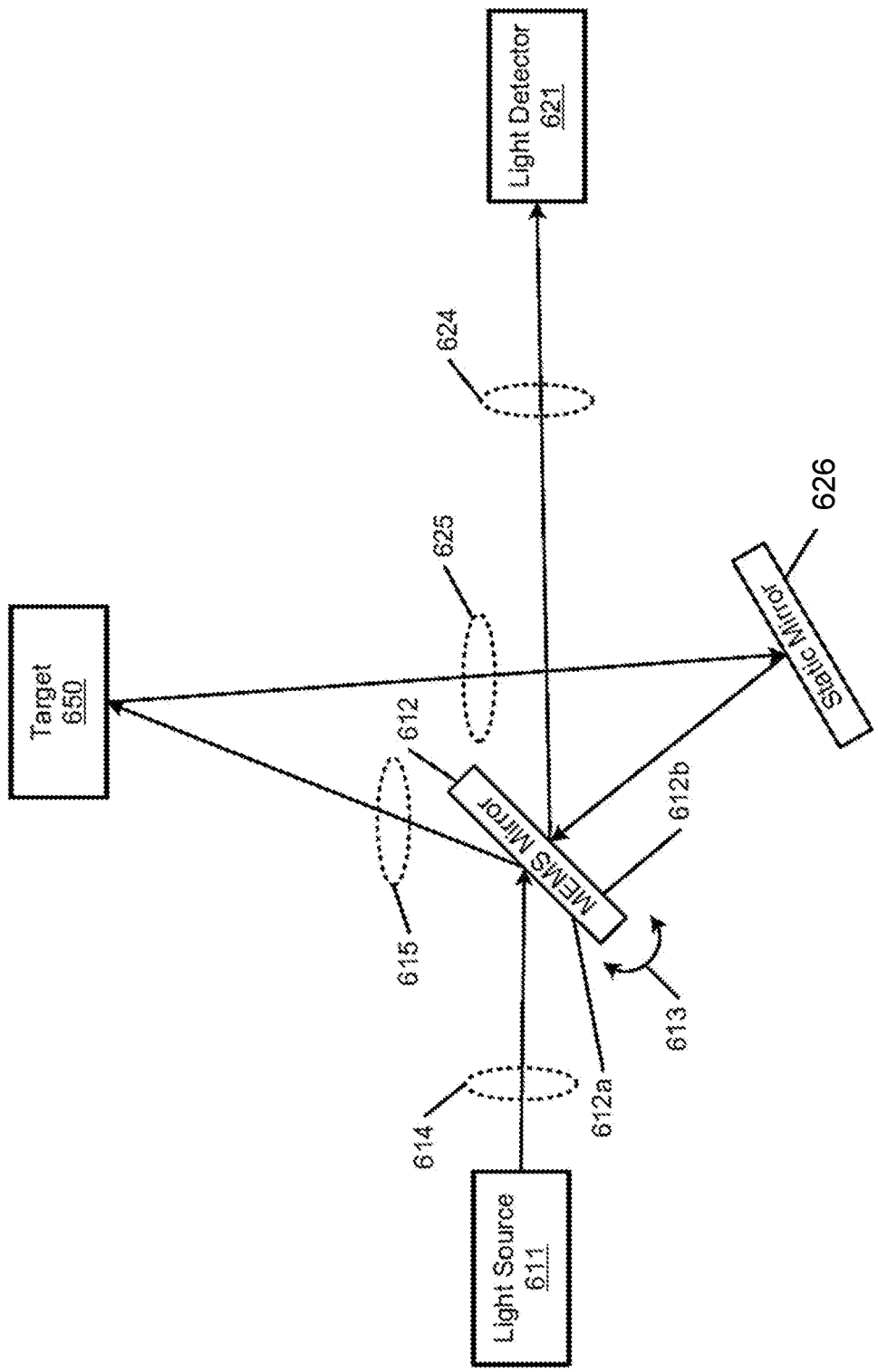
FIG. 8 is a block diagram illustrating an example of a configuration of a LIDAR device according to another embodiment of the invention.

FIG. 8 is a block diagram illustrating an example of a configuration of a LIDAR device according to another embodiment of the invention. Referring to FIG. 8, in this embodiment, MEMS mirror 612 is a double-sided mirror that includes first reflective surface 612a and second reflective surface 612b. Similar to the configuration as shown in FIG. 6, MEMS mirror 612 can rotate with respect to the fixed positon of light source 611 and/or light detector 621. However, a static mirror 626 is configured in a fixed position with respect to light source 611 and light detector 621. That is, in this configuration, only MEMS mirror 612 is rotatable, while light source 611, light detector 621, and static mirror 626 are attached to fixed positions.

In one embodiment, when light source 611 emits a light beam, the light beam reaches first reflective surface 612a of MEMS mirror 612, which reflects and redirects the light beam towards target 650. Target 650 reflects the light beam and the reflected light beam is received by static mirror 626. Static mirror 626 reflects the light beam towards second reflective surface 612b of MEMS mirror 612. Second reflective surface 612b then reflects the light beam to light detector 621. In this example, since first reflective surface 612a and second reflective surface 612b are positioned in a fixed position relative to each other, when MEMS mirror 612 rotates, both reflective surfaces rotate in a synchronized manner. Note that first reflective surface 612a and second reflective surface 612b do not have to the opposite sides of MEMS mirror 612. Rather, they can be in a particular fixed position with respect to each other, as long as they can redirect the light beam in multiple angles and enable light detector 621 to receive the corresponding reflected light beam in multiple angles.

The techniques described above demonstrate that a single light source and a single light detector can scan and make measurement of an object over a range of angles with the help of MEMS mirrors. According to another embodiment, a single light source can be utilized with multiple light detectors to achieve the same goal, where each light detector receives a reflected light beam within a subset of angles representing a subset of angular range.

Figure 9:
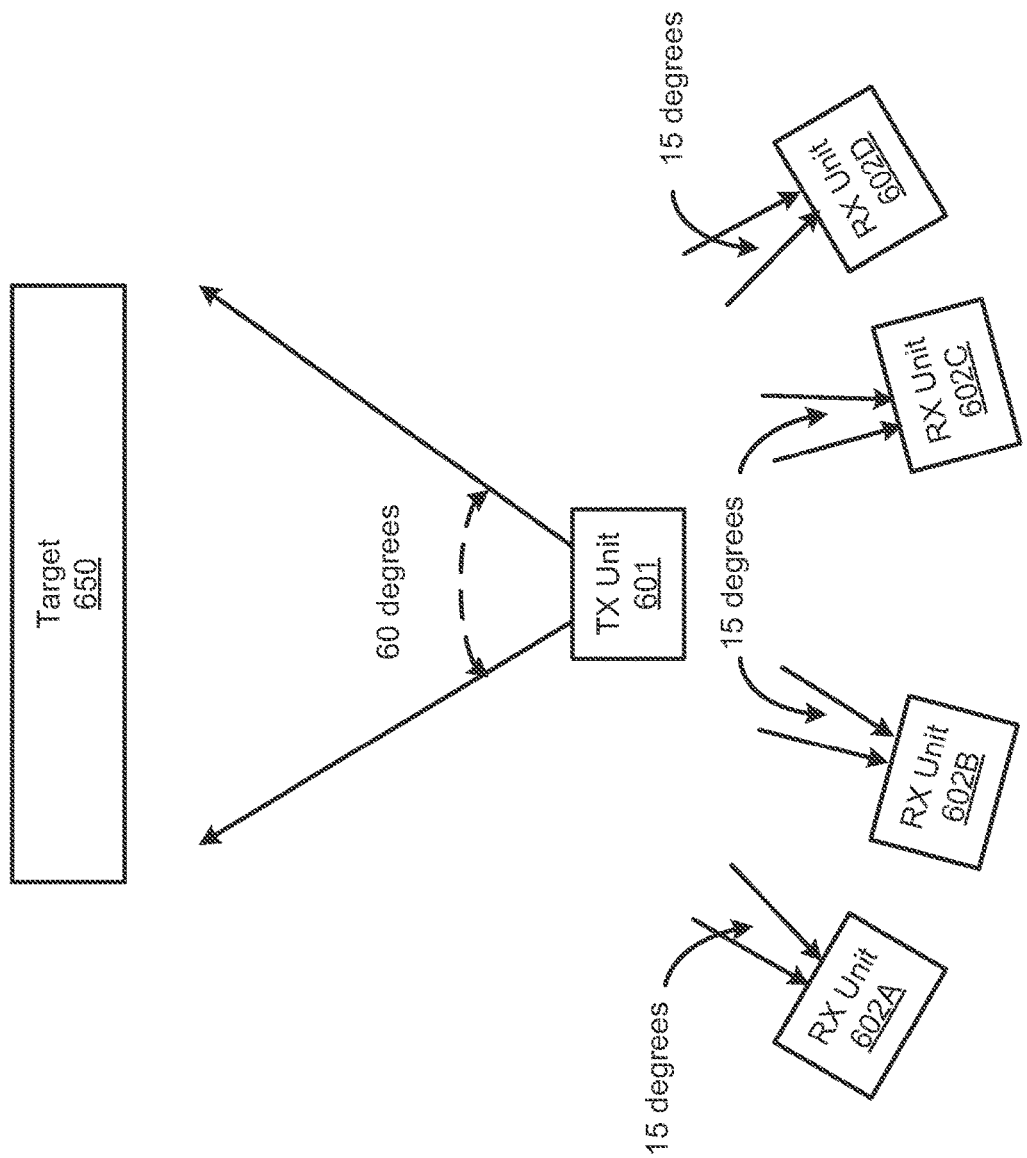
FIG. 9 is a block diagram illustrating an example of a configuration of a LIDAR device according to another embodiment of the invention.

FIG. 9 is a block diagram illustrating a LIDAR device according to another embodiment of the invention. Referring to FIG. 9, in this embodiment, TX unit 601 can generate and emit a light beam in larger angle range, in this example, in a range of 60 degrees. The LIDAR device further includes multiple RX units 602A-602D. TX unit 601 includes a light source and a MEMS mirror and each of RX units 602A-602D includes a light detector and a MEMS mirror as described above with respect to FIGS. 6 and 8. Each RX unit is configured to receive the reflected light beam in a subset of angles, in this example, 15 degrees. Although there are four RX units shown, more or fewer RX units may be implemented.

Figure 10:
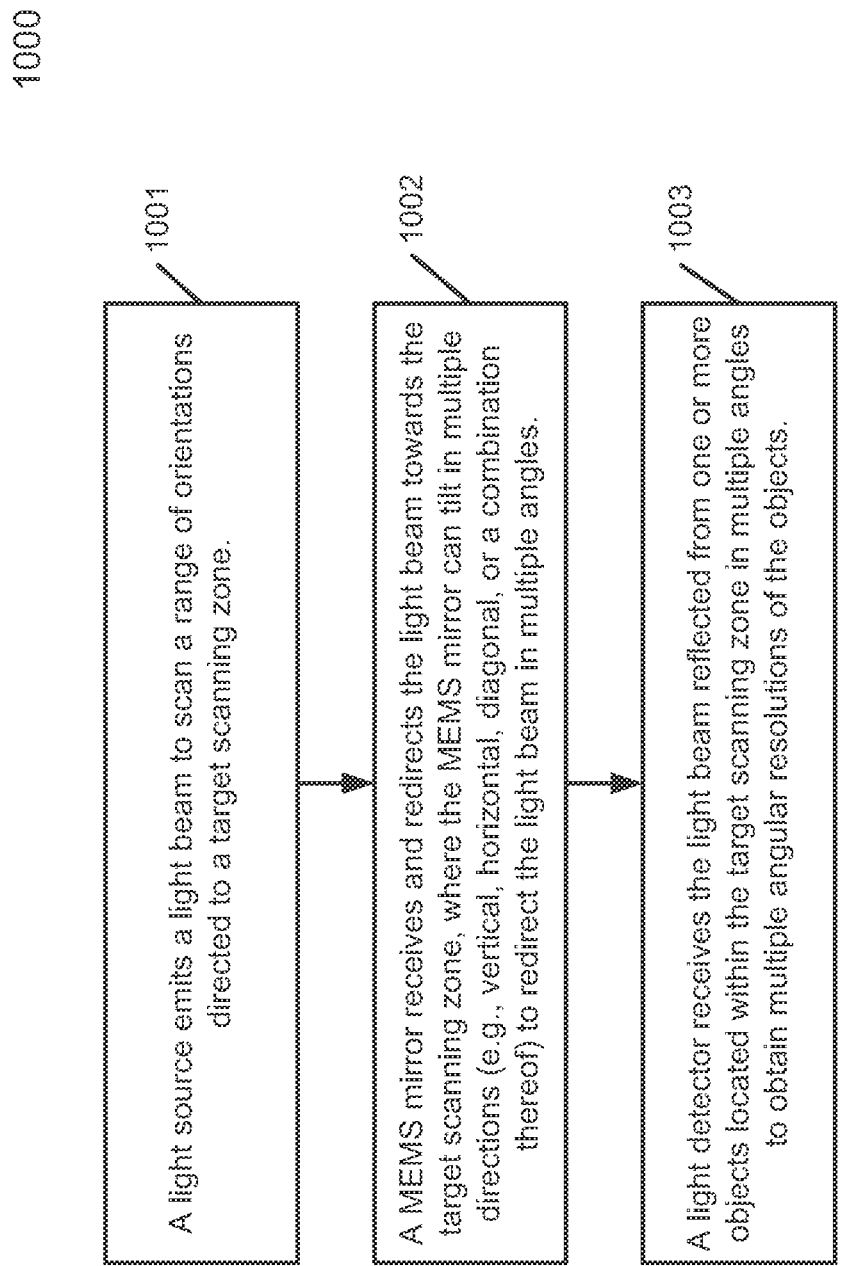
FIG. 10 is a flow diagram illustrating a process of operating a LIDAR device according to one embodiment of the invention.

FIG. 10 is a flow diagram illustrating a process of operating a LIDAR device according to one embodiment of the invention. Process 1000 can be performed by processing logic which may include hardware, software, or a combination thereof. Referring to FIG. 10, in operation 1001, a light source generates and emits a light beam attempted to scan a range of orientations directed to s target scanning zone. In operation 1002, a MEMS mirror receives and redirects the light beam towards the target scanning zone. The MEMS mirror can tilt or rotate in multiple directions to redirect the light beam in multiple angles. In operation 1003, a light detector receives the light beam reflected from one or more objects located within the target scanning zone in multiple angles to obtain multiple angular resolutions about the objects.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 11:
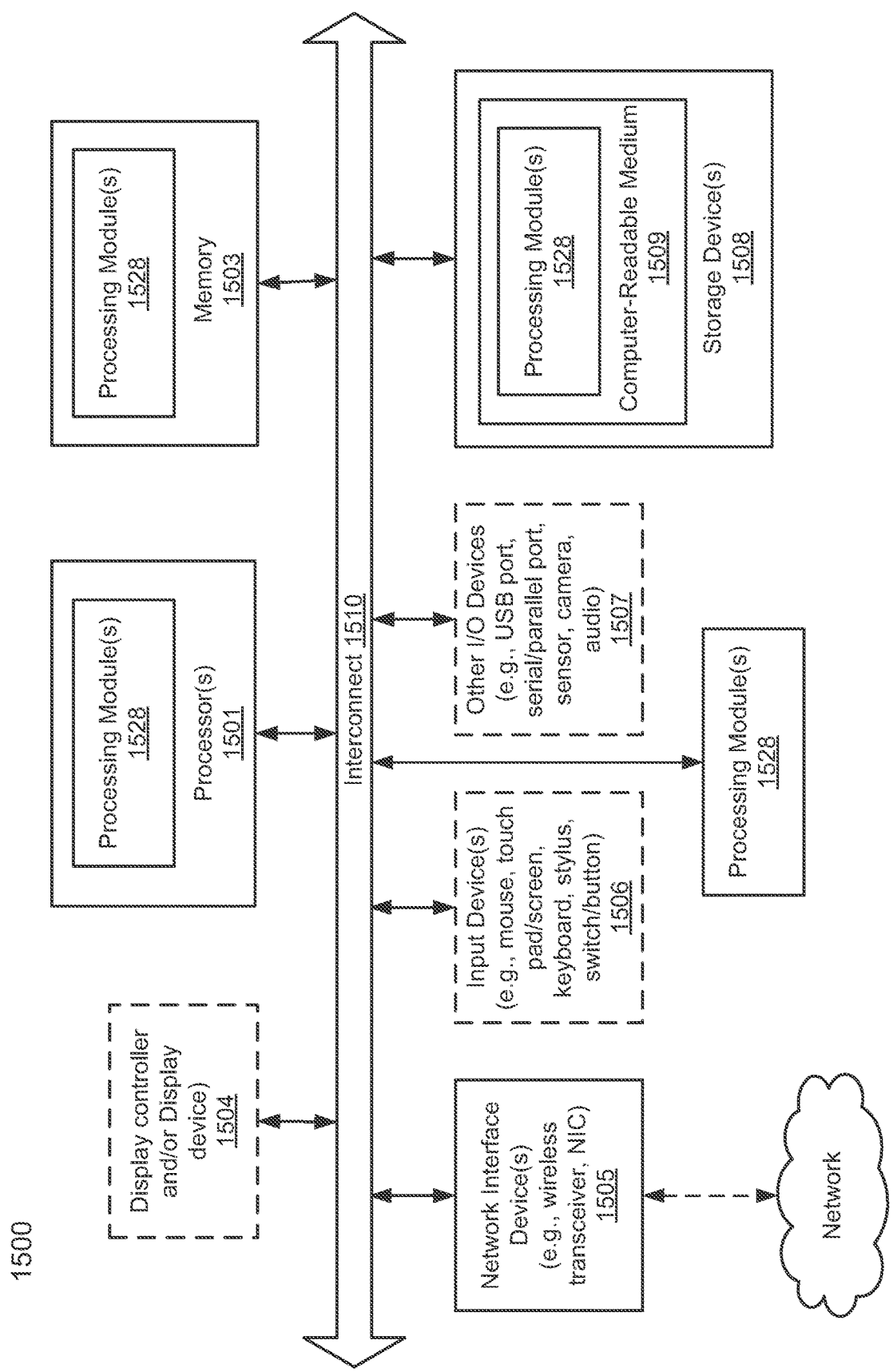
FIG. 11 is a block diagram illustrating a data processing system according to one embodiment.

FIG. 11 is a block diagram illustrating an example of a data processing system which may be used with one embodiment of the invention. For example, system 1500 may represent any of data processing systems described above performing any of the processes or methods described above, such as, for example, perception and planning system 110 or any of servers 103-104 of FIG. 2. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, modules 301-305 of FIG. 4, controller 603 or range finder 604 of FIG. 6. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A light detection and range (LIDAR) device, comprising:
    a transmitter (TX) unit including:
        a light source to emit a light beam to scan a range of orientations associated with a target scanning zone,
        a first lens configured to at least partially focus the light beam onto a first microelectromechanical system (MEMS),
        the first microelectromechanical system (MEMS) mirror configured to receive and redirect the light beam towards a second lens, wherein the first MEMs mirror is configured to tilt in a plurality of directions, including horizontally, vertically, or a combination thereof, with respect to the light source to redirect the light beam in a plurality of angles of a first angular range in the plurality of directions,
        the second lens configured to receive the light beam, redirected by the first MEMS, and to spread the received light beam, and to direct the spread light beam to the target scanning zone; and
    a plurality of receiver (RX) units, each RX unit including
        a light detector to receive the light beam reflected from one or more objects located within the target scanning zone, and
        a second MEMs mirror positioned to receive the light beam reflected from the one or more objects in a second angular range and to redirect the received light beam to the light detector, wherein the second angular range is a subset of the first angular range,
    wherein the first MEMS mirror tilts to allow the light source to emit the light beam in multiple angles and the light detector to receive the reflected light beam to obtain a plurality of angular resolutions of the one or more objects, wherein the light source and the first MEMS mirror both rotates horizontally about an axis to scan the target scanning zone, wherein the plurality of angles are captured by swinging the first MEMS mirror, and wherein the first MEMS mirror and the second MEMS mirror are synchronized according to a predetermined synchronization scheme.

2. The LIDAR device of claim 1, wherein the second MEMS mirror is configured to tilt in plurality of directions to receive the reflected light beam from the plurality of angles representing the plurality of angular resolutions.

3. The LIDAR device of claim 2, wherein the first MEMs mirror and the second MEMs mirror are synchronized by tilting according to the predetermined synchronization scheme, such that the light source can emit the light beam and the light detector can receive the reflected light beam in the plurality of angles, respectively.

4. The LIDAR device of claim 2, further comprising:
a third lens configured to receive the light beam reflected from the one or more objects within the target scanning zone and to focus the reflected light beam onto the second MEMS mirror in a second angle; and
a fourth lens configured to receive the reflected light beam from the second MEMS mirror toward the light detector, and to spread the reflected light beam to the light detector; and
the light detector configured to receive the spread reflected light beam from the fourth lens.

5. The LIDAR device of claim 4, further comprising:
the third lens having a predetermined focal point to receive the light beam reflected from the one or more objects and at least partially converting the light beam into a focused light beam, and at least partially converting the light beam into a collimated light beam, directed to the second MEMs mirror; and
the fourth lens receiving the light beam from the second MEMs mirrors and at least partially spreading the light beam, and at least partially collimating the light beam, directed to the light detector.

6. The LIDAR device of claim 1, further comprising:
the first lens having a predetermined focal point to receive the light beam from the light source and convert the light beam at least partially into a focused light beam and into at least a partially collimated light beam directed to the first MEMS mirror; and
the second lens to receive the light beam from the first MEMS mirror and to at least partially spread the light beam and at least partially collimate the light beam directed to the one or more objects.

7. A method for operating a light detection and range (LIDAR) device, comprising:
emitting, by a light source of a transmitter (TX) unit, a light beam to scan a range of orientations associated with a target scanning zone;
at least partially focusing, by a first lens, the light beam onto a first microelectromechanical system (MEMS);
receiving and redirecting, by the first microelectromechanical system (MEMS) mirror of the TX unit, the light beam towards a second lens, wherein the first MEMs mirror is configured to tilt in a plurality of directions, including horizontally, vertically, or a combination thereof, with respect to the light source to redirect the light beam in a plurality of angles of a first angular range;

receiving and spreading, by the second lens, the light beam redirected by the first MEMS and directing the spread light beam to the target scanning zone;
receiving, by a light detector of each of a plurality of receiver (RX) units, the light beam reflected from one or more objects located within the target scanning zone;
receiving, by a static mirror of each RX unit, the light beam reflected from the one or more objects in a second angular range; and
redirecting, by the static mirror of each RX unit, the received light beam to the light detector, wherein the second angular range is a subset of the first angular range,
wherein the first MEMS mirror tilts in a plurality of directions to allow the light source to emit the light beam in multiple angles and the light detector to receive the reflected light beam to obtain a plurality of angular resolutions of the one or more objects, wherein the light source and the first MEMS mirror both rotates horizontally about an axis to scan the target scanning zone, wherein the plurality of angles are captured by swinging the first MEMS mirror, and wherein the first MEMS mirror and the static MEMS mirror are synchronized according to a predetermined synchronization scheme.

8. The method of claim 7, wherein the static mirror is configured to tilt in a plurality of directions to receive the reflected light beam from the plurality of angles representing the plurality of angular resolutions.

9. The method of claim 8, wherein the first MEMs mirror and the static mirror are synchronized by tilting according to the predetermined synchronization scheme, such that the light source can emit the light beam and the light detector can receive the reflected light beam in the plurality of angles, respectively.

10. The method of claim 8, further comprising:
receiving, via a third lens, the light beam reflected from the one or more objects within the target scanning zone from a first angle and focusing via the third lens the reflected light beam onto the second MEMS mirror in a second angle; and
receiving via a fourth lens the reflected light beam from the second MEMS mirror and spreading, via the second lens the reflected light beam to the light detector; and
receiving, by the light detector, the spread light beam from the fourth lens.

11. The method of claim 10, further comprising:
the third lens having a predetermined focal point to receive the light beam reflected from the one or more objects and at least partially converting the light beam into a focused light beam, and at least partially into a collimated light beam, directed to the second MEMs mirror; and
the fourth lens receiving the light beam from the second MEMs mirrors and at least partially spreading the light beam, and at least partially collimating the light beam, directed to the light detector.

12. The method of claim 7, further comprising:
the first lens having a predetermined focal point to receive the light beam from the light source and converting the light beam at least partially into a focused light beam and into at least a partially collimated light beam directed to the first MEMS mirror; and
the second lens receiving the light beam from the first MEMs mirror and at least partially spreading the light beam and at least partially collimating the light beam directed to the one or more objects.

* * * * *